United States Patent
Sworowski et al.

(10) Patent No.: US 10,625,774 B2
(45) Date of Patent: Apr. 21, 2020

(54) STEERING SYSTEM FOR A MOTOR VEHICLE

(71) Applicant: Robert Bosch Automotive Steering GmbH, Schwäbisch Gmünd (DE)

(72) Inventors: Eugen Sworowski, Lorch (DE); Alexander Gaedke, Mutlangen (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 442 days.

(21) Appl. No.: 15/550,935

(22) PCT Filed: Nov. 24, 2015

(86) PCT No.: PCT/EP2015/077409
§ 371 (c)(1),
(2) Date: Aug. 14, 2017

(87) PCT Pub. No.: WO2016/131506
PCT Pub. Date: Aug. 25, 2016

(65) Prior Publication Data
US 2018/0029636 A1    Feb. 1, 2018

(30) Foreign Application Priority Data
Feb. 17, 2015   (DE) .................. 10 2015 102 228

(51) Int. Cl.
*B62D 5/04* (2006.01)
*H02K 11/20* (2016.01)
(Continued)

(52) U.S. Cl.
CPC ............. *B62D 5/0481* (2013.01); *H02K 5/10* (2013.01); *H02K 11/20* (2016.01); *H02K 21/02* (2013.01); *H02K 2211/00* (2013.01)

(58) Field of Classification Search
CPC .................................................... B62D 5/0481
See application file for complete search history.

(56) References Cited

U.S. PATENT DOCUMENTS 8,073,577 B2 * 12/2011 Kitamura ............ B60R 16/0231
307/10.1
2015/0175192 A1 * 6/2015 Sin ...................... B62D 5/0484
318/483
(Continued)

FOREIGN PATENT DOCUMENTS

DE        102 49 370 A1    5/2004
DE   10 2006 051 799 A1    5/2008
(Continued)

OTHER PUBLICATIONS

International Search Report corresponding to PCT Application No. PCT/EP2015/077409, dated Feb. 23, 2016 (German and English language document) (7 pages).

*Primary Examiner* — Joseph M Rocca
*Assistant Examiner* — Conan D Duda
(74) *Attorney, Agent, or Firm* — Maginot, Moore & Beck LLP

(57) ABSTRACT

A steering system for a motor vehicle comprises an electric servomotor, as well as a water ingress detection device, at least one phase line of said servomotor being connected to a detection line for detecting the water level in a water-collecting area.

11 Claims, 3 Drawing Sheets

(51) Int. Cl.
*H02K 5/10* (2006.01)
*H02K 21/02* (2006.01)

(56) References Cited

U.S. PATENT DOCUMENTS

| | | | | |
|---|---|---|---|---|
| 2016/0001815 A1* | 1/2016 | Sasaki | ............... | B62D 5/0481 |
| | | | | 701/43 |
| 2016/0181885 A1* | 6/2016 | Yamasaki | ............. | H02K 11/33 |
| | | | | 180/443 |
| 2017/0341681 A1* | 11/2017 | Shiino | ............... | B62D 5/0481 |
| 2018/0029636 A1* | 2/2018 | Sworowski | .......... | B62D 5/0481 |
| 2018/0178739 A1* | 6/2018 | Fujimoto | ............. | B62D 5/0406 |
| 2018/0194390 A1* | 7/2018 | Goto | ................... | B62D 5/0481 |
| 2019/0047611 A1* | 2/2019 | Murakami | ............. | H02K 5/225 |
| 2019/0176872 A1* | 6/2019 | Sato | ......................... | B62D 3/08 |
| 2019/0193780 A1* | 6/2019 | Racz | ....................... | B62D 5/04 |
| 2019/0248408 A1* | 8/2019 | Boda | ....................... | B62D 5/04 |
| 2019/0277721 A1* | 9/2019 | Collier | ................ | B62D 5/0481 |

FOREIGN PATENT DOCUMENTS

| | | | |
|---|---|---|---|
| DE | 10 2012 023 073 A1 | 5/2013 | |
| EP | 2 679 434 A1 | 1/2014 | |
| JP | 2006-111032 A | 4/2006 | |
| WO | WO-2008052915 A1 * | 5/2008 | ........... G01F 23/223 |

* cited by examiner

STEERING SYSTEM FOR A MOTOR VEHICLE

This application is a 35 U.S.C. § 371 National Stage Application of PCT/EP2015/077409, filed on Nov. 24, 2015, which claims the benefit of priority to Serial No. DE 10 2015 102 228.1, filed on Feb. 17, 2015 in Germany, the disclosures of which are incorporated herein by reference in their entirety.

BACKGROUND

The disclosure relates to a steering system for a motor vehicle having a water ingress detection device for detecting water ingress.

DE 10 2006 051 799 A1 discloses a steering system for a motor vehicle, said steering system being fitted with a detection device for detecting water ingress into the steering box of the steering system. The detection device for water ingress comprises an electrode that protrudes into the steering box and is connected by way of a connecting line to an electrical line of a torque sensor. In the event of water entering into the steering box, the electrode is electrically connected to the ground potential of the steering box, as a result of which the voltage potential of the electrical line of the torque sensor drops, which can be detected by means of an electronic control system.

The object of the disclosure is to provide by means of simple measures a steering system for a motor vehicle in such a manner that it is possible to detect water ingress into a housing of a component of the steering system.

This object is achieved in accordance with the disclosure. The embodiments disclose expedient further developments.

The steering system in accordance with the disclosure that is used in motor vehicles comprises an electric servomotor for generating a servo torque that supports the steering movement and furthermore said steering system comprises a water ingress detection device, with the aid of which it is possible to detect water ingress into a housing of a component of the steering system. The servomotor is connected by way of a coupling device to the steering gear of the steering system, by way of which the steering movement that is predetermined by the driver by way of the steering wheel is converted into the front wheel steering movement. The electric servomotor is controlled by way of a control device in which an electronic power system is located. The magnitude of the supporting servo torque can be made to be dependent upon the steering torque that is determined by way of a steering torque sensor in the steering system.

It is fundamentally possible for water to ingress at various sites in the steering system. By way of example, the steering linkage that is part of the steering mechanism is received in a steering box into which it is possible for water to ingress at various sites, by way of example in the region of the steering shaft that is guided into the steering box, and/or in the region of the connection of the electric servomotor or a transmission that is arranged between the servomotor and the steering mechanism. It is also possible for water to ingress into the motor housing of the servomotor and/or the housing of the control device of the servomotor, in particular in the region of the connection to the steering box or in the connecting region between the motor housing and control device housing.

The water ingress detection device is achieved by virtue of the fact that an electrical detecting line is connected to a phase line for supplying current to the servomotor, wherein the electrical detecting line is used to determine the water level in a water collecting region in the housing that is being investigated. If water is located in the water collecting region in the housing, the electrical resistance changes, which owing to the connection of the detecting line to the phase line of the servomotor leads to a voltage change in the phase line that can be detected. The voltage change is in particular determined by an electronic evaluating system in the control device and can be further processed in the control device by way of which the servomotor is controlled and is supplied with current.

This embodiment has the advantage that the water ingress detection device can be produced using simple measures alone by virtue of the fact that a detecting line is connected to a phase line so as to supply current of the servomotor. Since the phase line is connected to the control device and is controlled by said control device, it is also possible to ascertain the voltage change in the phase line in the control device so that a separate evaluating unit is not required. On the contrary, it is possible to use the hardware that is already present for electric servo support.

The water ingress detection device requires only an electric servomotor in the steering system. Further devices such as for example a torque sensor can in fact be a component of the steering system, however said further devices are not required for detecting water in the housing associated with the steering system.

The electrical detecting line extends, in accordance with an advantageous embodiment, between the phase line and the water collecting region. One end of the detecting line is electrically connected to the phase line, the other end of the detecting line is used for the purpose of closing a current circuit in the event of water ingress so that the detecting line is electrically connected to the ground of the housing. This end of the detecting line protrudes, in accordance with a preferred embodiment, into the water collecting region in the housing, wherein it fundamentally suffices that only the free end of the detecting line protrudes without additional electrodes or sensors. As soon as water is collected in the region and the free end of the detecting line is moistened, the electrical resistance between the detecting line and the walls of the housing is decreased, as a result of which the voltage potential is reduced at least approximately to the ground potential of the housing.

However, other embodiments are also possible in which the detecting line is connected by way of example to an electrode that protrudes into the water collecting region.

In each case it is expedient that the free end protrudes into the water collecting region with a spacing with respect to the delimiting walls. This ensures that a sufficiently high electrical resistance is present between the detecting line and the walls of the housing for the case that no water or only a little water is received in the water collecting region and the free end of the detecting line—or where appropriate an electrode that is connected to the detecting line—is not in contact with the water.

In accordance with an advantageous embodiment, at least two different phase lines are provided for the electric servomotor, said phase lines in each case being connected to an electrical detecting line for detecting the water level in a water collecting region. This renders possible by way of example a redundant embodiment in which the at least two detecting lines protrude into the same water collecting region, wherein a voltage change occurs in each phase line if the allocated detecting line comes into contact with water.

By way of example, embodiments are also possible in which the detecting lines protrude different distances into the water collecting region and consequently set a voltage change in the associated phase lines in the case of different fill levels of water in the water collecting region. Furthermore, it is also possible that the different detecting lines protrude into different water collecting regions so that it is possible to monitor different housings or different housing sections within a housing regarding water ingress.

In accordance with a further advantageous embodiment, a phase line is connected to at least two different detecting lines that either protrude into the same water collecting space or into different water collecting spaces. Also in this case either redundant embodiments or the simultaneous monitoring of different water collecting regions are possible. As soon as one of the detecting lines comes into contact with water, the voltage in the phase line drops.

Moreover, in accordance with a further expedient embodiment an electrical connecting line between the housing, in which the water collecting space is located, and the control device of the electric servomotor is associated with the water ingress detection device. In this manner in the case of a corresponding fill level of water in the water collecting space a closed current circuit is produced by way of the electrical connecting line between the control device and the housing and also the detecting line and the phase line that likewise is connected to the control device.

In accordance with a further expedient embodiment, the electric servomotor is a synchronous motor, by way of example a three-phase synchronous motor. In general, both synchronous motors as well as asynchronous motors are considered. It is possible to use motors with n phases, by way of example the mentioned three phases or 2×3 phases.

The servomotor is preferably embodied as an electrically commutated motor and preferably comprises permanent magnets on the rotor. Each phase of the synchronous motor is allocated a phase line so that altogether three phase lines are available, of which one or multiple phase lines are connected to detecting lines in order to be able to monitor the fill level in one or multiple water collecting spaces in one or multiple housings of the steering system.

BRIEF DESCRIPTION OF THE DRAWINGS

Further advantages and expedient embodiments are evident in the description of the figures and the drawings. In the drawings.

DETAILED DESCRIPTION

Figure 1:
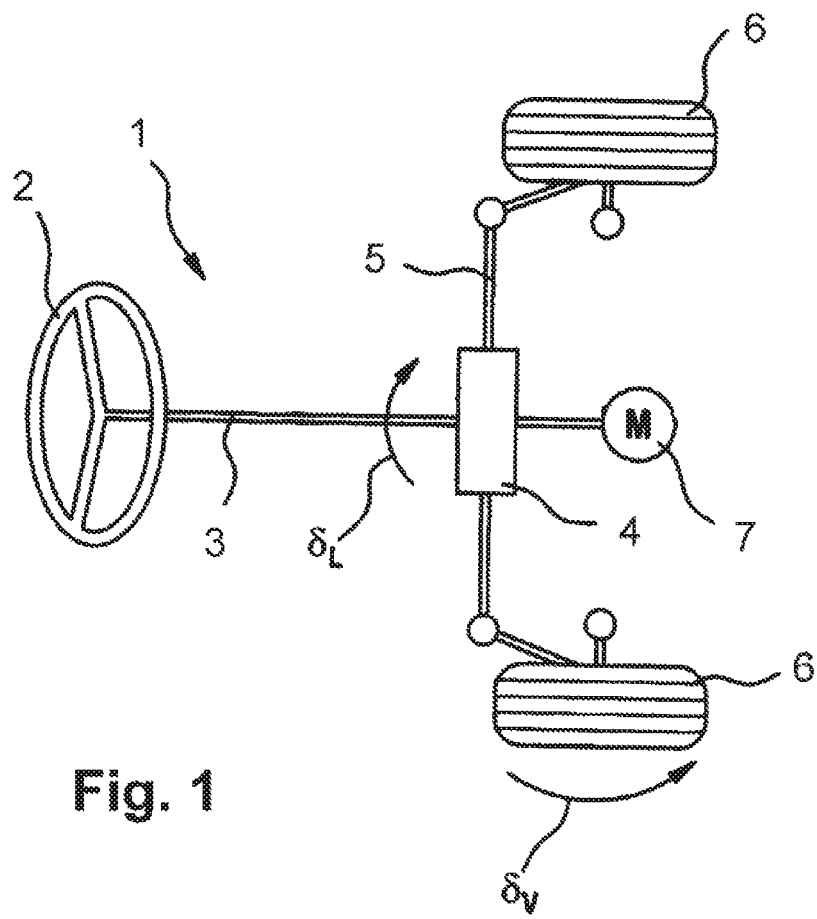
FIG. 1 illustrates schematically a steering system in a vehicle.

In the figures, identical components are provided with identical reference numerals.

The steering system 1 that is illustrated in FIG. 1 comprises a steering wheel 2, a steering spindle or shaft 3, a steering box 4 having a steering gear, which is housed in said steering box, and a steering linkage having a steering rack 5 by way of which a steering movement is transmitted to the steerable wheels 6 of the vehicle. The driver provides a steering angle $\delta_L$ by way of the steering wheel 2, to which the steering spindle 3 is fixedly connected, and said steering angle is transmitted in the steering gear in the steering box 4 to the steering rack 5 of the steering linkage, whereupon a wheel steering angle $\delta_V$ of the steerable wheels 6 is set at the steerable wheels.

An electric servomotor 7 is used to support the hand torque that is applied by the driver and a servo torque can be supplied by way of said servo motor into the steering gear in the steering box 4.

Figure 2:
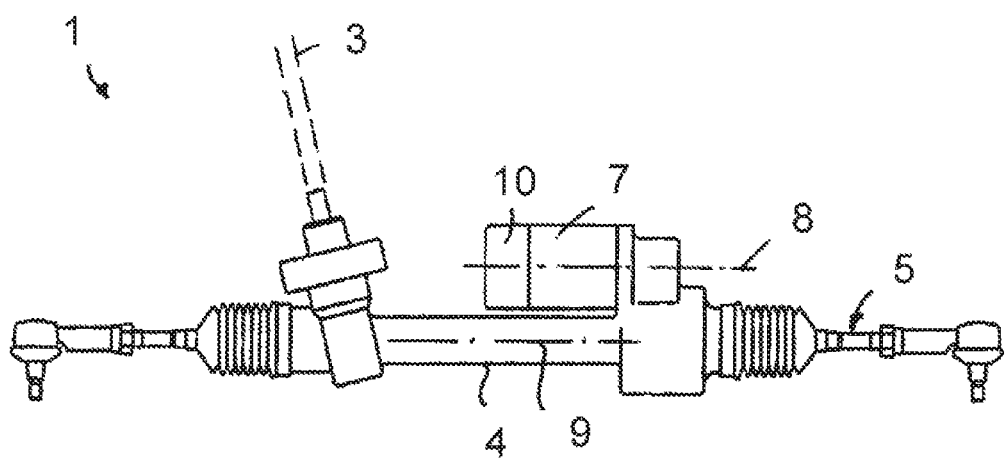
FIG. 2 illustrates the steering system having an electric servomotor in an axially parallel arrangement with respect to a rack of the steering system.

As is evident in the illustration in accordance with FIG. 2, the servomotor 7 is arranged in an exemplary manner in an axis parallel manner with respect to the steering linkage 5. The servomotor 7 is flange-mounted onto the steering box 4, wherein the motor shaft longitudinal axis 8 of the servomotor 7 extends parallel to the longitudinal axis 9 of the steering box and a rack that is part of the steering linkage 5 and is adjusted by the steering shaft 3 in a translational manner along the longitudinal axis 9. The drive movement of the motor shaft of the electric servomotor 7 is transferred as a supporting movement to the rack of the steering linkage 5. A control device 10 is allocated to the servo motor 7 and the motor control of the servo motor is performed by way of said control device.

Figure 3:
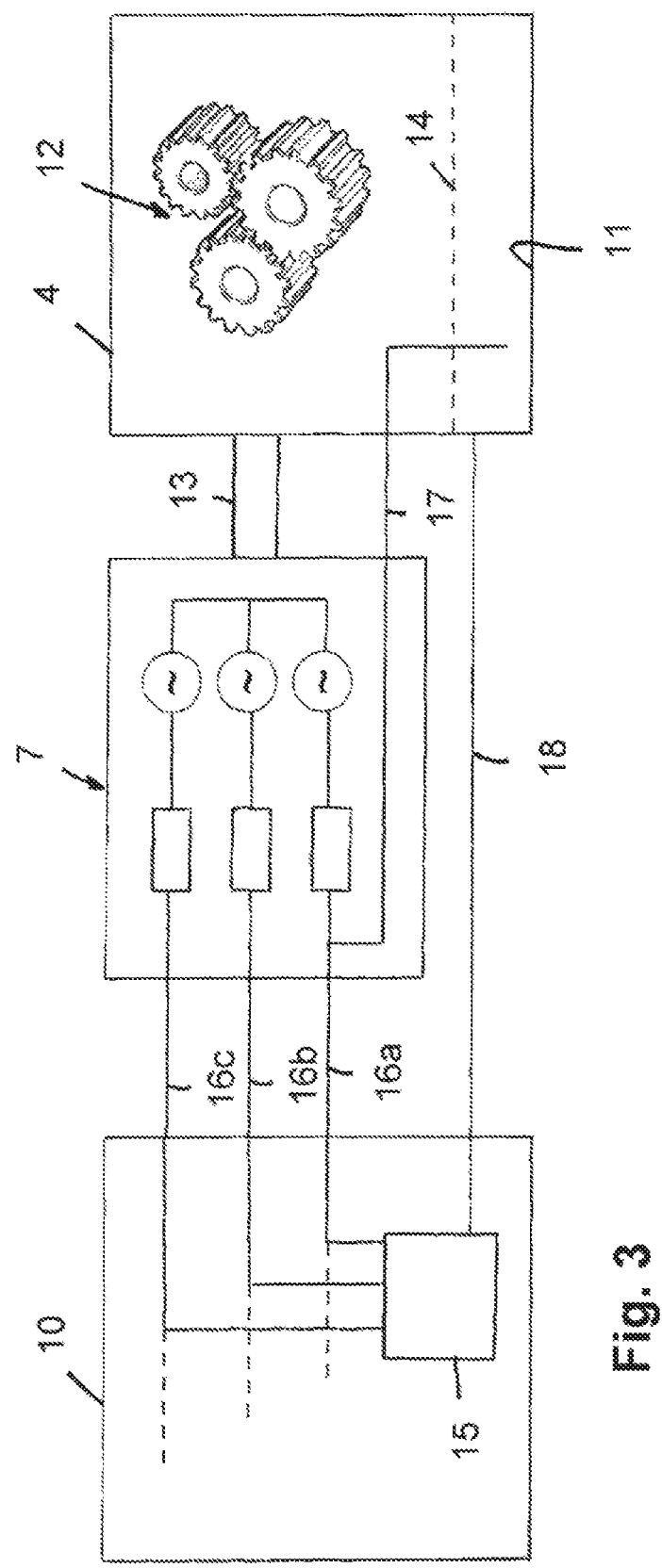
FIG. 3 illustrates a water ingress detection device of the steering system in an illustration as a block diagram.

FIG. 3 illustrates in a block diagram a part of the steering system with which a water ingress detection device is achieved the steering system and it is possible by means of said water ingress detection device to detect water collecting in a water collecting region 11 in the steering system. The water collecting region 11 is located in the steering box 4 of the steering system in which the steering mechanism 12 is housed—symbolized in FIG. 3 by means of three gear wheels that are driven by way of the motor shaft 13 of the electric servomotor 7. The fill level 14 of the water in the water collecting region 11 is characterized by a dashed line.

The electric servomotor 7 is controlled by the control device 10 in which an electronic power system and also an evaluating unit 15 are located. The electric servomotor 7 is embodied as a three-phase synchronous motor and is supplied with current by the control device 10 by way of three phase lines 16a, 16b, 16c. A detecting line 17 branches from the phase line 16a and the free end of said detecting line protrudes into the water collecting region 11 in the steering box 4. The free end of the detecting line 17 is at a distance from the delimiting walls of the steering box 4. It can be expedient to arrange an electrode on the free end of the detecting line 17.

Furthermore, the steering box 4 is connected to the control device 10 by way of a connecting line 18. The connecting line 18 can be a part of an EMV filter (electromagnetic compatibility).

If water is located in the water collecting region 11 and the water reaches the fill level 14, the free end of the detecting line 17 lies in the water in the water collecting region and a current circuit across the connecting line and the detecting line 17 and also the phase line 16a is closed. As a consequence, the voltage potential in the phase line 16a drops to the ground potential of the housing 4, which can be registered in the evaluating unit 15 in the control device 10. Furthermore, it is possible to generate a warning signal that can be displayed by way of example to the driver.

In contrast, if water is not located in the water collecting region 11 or the fill level 14 is lower than the free end of the detecting line 17, the current circuit across the detecting line 17 is interrupted so that the potential in the phase line 16a remains uninfluenced.

Figure 4:
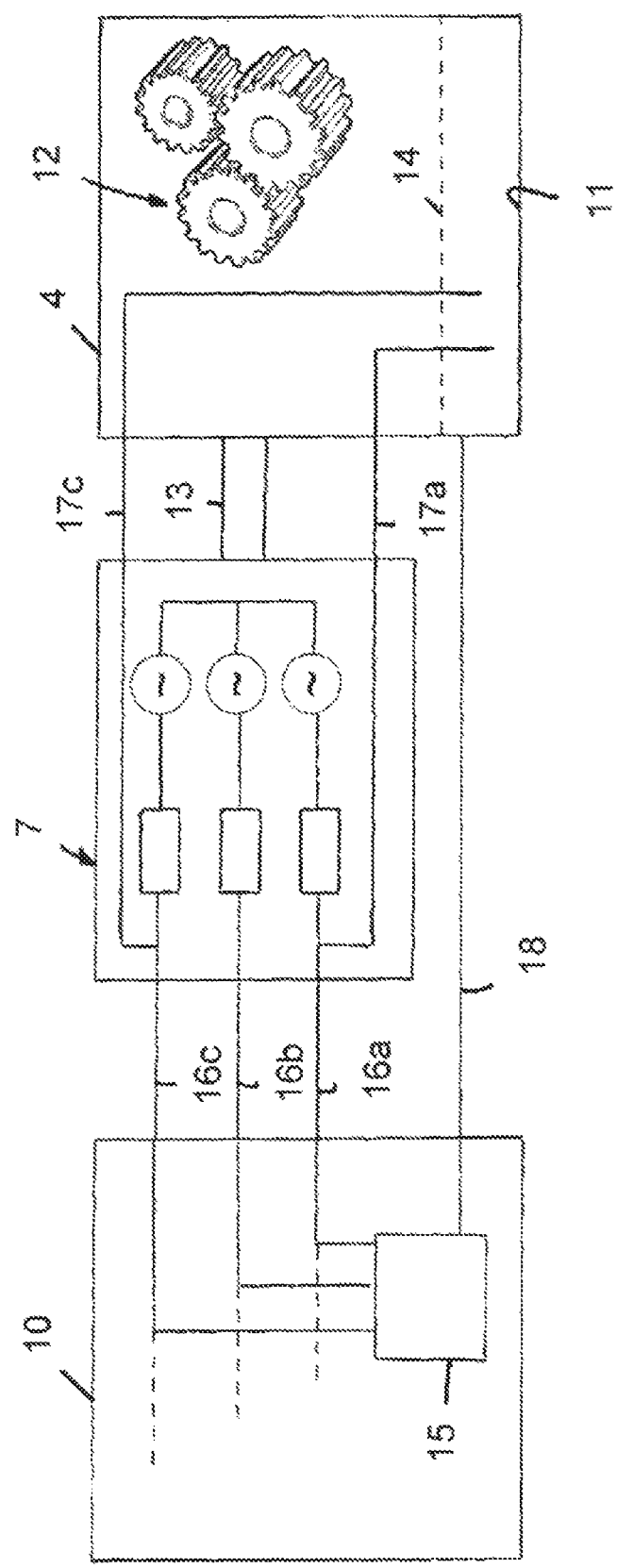
FIG. 4 illustrates in an embodiment variant a water ingress detection device of the steering system.

The block diagram in FIG. 4 illustrates the same device as in FIG. 3 so that in relation to the corresponding components reference is made to the description in accordance with FIG. 3. However, what is different in FIG. 4 is that altogether two detecting lines 17a, 17c are present that in each case branch from a phase line 16a, 16c of the servomotor 7 and the free ends of said detecting lines in each case protrude into the water collecting chamber 11. In this manner, it is possible to achieve a redundant design of the water ingress detection device. In the case of the illustrated fill level 14 of the water in the water collecting region 11, the ends of the two detecting lines 17a, 17c are immersed in the water so that each case a current circuit is closed and the voltage potential in the two-phase lines 16a, 16c decreases. The voltage drop can be registered in the evaluating unit 15.

As illustrated, the ends of the detecting lines 17a, 17c can terminate at different heights so that ,as the water level rises in the water collecting region 11, initially the detecting line 17a that is located closer to the base of the water collecting region 11 comes into contact with water and the detecting line 17c that ends further away from said base only comes into contact with water subsequently. However, it is also possible that the two detecting lines 17a, 17c terminate at the same height in the water collecting region 11.

LIST OF REFERENCE NUMERALS

1 Steering system
2 Steering wheel
3 Steering shaft
4 Steering box
5 Steering rack
6 Front wheel
7 Electric servomotor
8 Motor shaft longitudinal axis
9 Longitudinal axis
10 Control device
11 Water collecting region
12 Steering mechanism
13 Motor shaft
14 Fill level
15 Evaluating unit
16 Phase line
17 Detecting line
18 Connecting line

The invention claimed is:

1. A steering system for a motor vehicle, the steering system comprising:
an electric servomotor configured to generate a servo torque that supports a steering movement;
a water ingress detection device configured to detect water ingress into one of (i) a housing of the steering system and (ii) a component of the steering system,
wherein at least one phase line of a current supply of the electric servomotor is connected to an electrical detecting line so as to detect a water level in a water collecting region in the housing.

2. The steering system as claimed in claim 1, wherein the electrical detecting line extends between the at least one phase line and the water collecting region.

3. The steering system as claimed in claim 1, wherein the electrical detecting line protrudes into the water collecting region.

4. The steering system as claimed in claim 1, wherein the at least one phase line for the current supply of the electric servomotor is connected to multiple electrical detecting lines so as to detect one of (i) the water level in the water collecting region and (ii) water levels in multiple different water collecting regions.

5. The steering system as claimed in claim 1, wherein at least two different phase lines of the electric servomotor connected to in each case a respective electrical detecting line so as to detect a respective water level in a respective water collecting region in the housing.

6. The steering system as claimed in claim 5, wherein the respective electrical detecting lines connected to the at two different detecting lines are used so as to detect a water level in a same water collecting region.

7. The steering system as claimed in claim 1, wherein the housing is a steering box of the steering system configured to receive a steering mechanism.

8. The steering system as claimed in claim 1, wherein the housing is a motor housing configured to receive at least one of (i) the electric servomotor and (ii) a control device of the electric servomotor.

9. The steering system as claimed in claim 1, wherein the electric servomotor is a synchronous motor.

10. The steering system as claimed in claim 1, wherein the water ingress detection device comprises an electrical connecting line connected between the housing and a control device of the electric servomotor.

11. The steering system as claimed in claim 9, wherein the electric servomotor is a synchronous motor is a three-phase synchronous motor.

* * * * *